United States Patent
Dong

(10) Patent No.: US 10,397,814 B2
(45) Date of Patent: Aug. 27, 2019

(54) WIRELESS COMMUNICATION METHOD AND DEVICE

(71) Applicant: Meizu Technology Co., Ltd., Zhuhai, Guangdong (CN)

(72) Inventor: Xiandong Dong, Guangdong (CN)

(73) Assignee: Meizu Technology Co., Ltd., Zhuhai, Guangdong (CN)

( * ) Notice: Subject to any disclaimer, the term of this patent is extended or adjusted under 35 U.S.C. 154(b) by 0 days.

(21) Appl. No.: 15/574,366

(22) PCT Filed: May 26, 2016

(86) PCT No.: PCT/CN2016/083495
§ 371 (c)(1),
(2) Date: Nov. 15, 2017

(87) PCT Pub. No.: WO2016/192578
PCT Pub. Date: Dec. 8, 2016

(65) Prior Publication Data
US 2018/0139637 A1 May 17, 2018

(30) Foreign Application Priority Data
May 29, 2015 (CN) .......................... 2015 1 0289954

(51) Int. Cl.
*H04W 24/08* (2009.01)
*H04B 17/318* (2015.01)
(Continued)

(52) U.S. Cl.
CPC .......... *H04W 24/08* (2013.01); *H04B 17/318* (2015.01); *H04W 24/02* (2013.01);
(Continued)

(58) Field of Classification Search
CPC ... H04W 72/04; H04W 72/048; H04W 24/02; H04W 24/08; H04B 17/318
See application file for complete search history.

(56) References Cited

U.S. PATENT DOCUMENTS

2015/0071215 A1   3/2015   Tian et al.
2015/0078299 A1   3/2015   Barriac et al.
(Continued)

FOREIGN PATENT DOCUMENTS

CN   104185188 A   12/2014
CN   104581645 A   4/2015
(Continued)

OTHER PUBLICATIONS

Oteri et al. "Advanced Power Control Techniques for Interference Mitigation in Dense 802.11 Networks", 16th International Symposium on Wireless Personal Multimedia Communications (WPMC), Jun. 27, 2013, 7 pages.
(Continued)

*Primary Examiner* — Gary Mui
(74) *Attorney, Agent, or Firm* — Bret E. Field; Bozicevic, Field & Francis LLP

(57) ABSTRACT

Embodiments of the invention disclose a wireless communication method, comprising: determining by a first data transmitter whether the presence of a second data receiver is sensed, when the first data transmitter senses that a second data transmitter transmits data to the second data receiver; wherein the first data transmitter and the second data transmitter are located in an overlapping basis service set (OBSS), and the first data transmitter needs to transmit data to a first data receiver; analyzing by the first data transmitter whether the second data transmitter senses the presence of the first data receiver, when determining that the presence of a second data receiver is not sensed; and transmitting data to the first data receiver by the first data transmitter, when
(Continued)

analyzing that the second data transmitter does not sense the presence of the first data receiver. The invention further discloses a related device. By adopting the technical solutions of the invention, the problem in the prior art that devices in the OBSS cannot simultaneously transmit data is solved, and a CCA mechanism in the prior art is improved to enable the devices in the OBSS to simultaneously transmit data, so that the efficiency of spectrum utilization of the system is greatly improved.

8 Claims, 6 Drawing Sheets

(51) Int. Cl.
    *H04W 24/02*     (2009.01)
    *H04W 72/04*     (2009.01)
    *H04W 74/08*     (2009.01)
    *H04W 84/12*     (2009.01)

(52) U.S. Cl.
    CPC ..... *H04W 72/048* (2013.01); *H04W 74/0816* (2013.01); *H04W 84/12* (2013.01)

(56) References Cited

U.S. PATENT DOCUMENTS

| | | | | |
|---|---|---|---|---|
| 2015/0139127 A1* | 5/2015 | Oh | ...................... | H04L 25/0204 370/329 |
| 2015/0139212 A1 | 5/2015 | Wang et al. | | |
| 2016/0066196 A1 | 3/2016 | Jiang et al. | | |
| 2016/0080954 A1* | 3/2016 | Hedayat | ............... | H04B 17/318 370/252 |
| 2016/0081031 A1* | 3/2016 | Barriac | ............. | H04W 52/0261 370/311 |
| 2016/0330663 A1* | 11/2016 | Zhou | ..................... | H04W 4/025 |
| 2017/0086224 A1* | 3/2017 | Wilhelmsson | ...... | H04W 72/121 |
| 2017/0294949 A1* | 10/2017 | Zhang | .................. | H04B 7/0617 |
| 2017/0311352 A1* | 10/2017 | Lv | ....................... | H04W 74/002 |
| 2017/0353911 A1* | 12/2017 | Wikstrom | ............. | H04W 84/12 |
| 2018/0132278 A1* | 5/2018 | Oteri | ..................... | H04W 74/02 |

FOREIGN PATENT DOCUMENTS

CN             105101432 A     11/2015
WO     WO2014179713 A1     11/2014

OTHER PUBLICATIONS

Wu et al. "A Novel Scheme to Ease the Problem of OBSS Networks Based on Admission Control and TPC", 14$^{th}$ International Symposium on Communications and Information Technologies (ISCIT), Sep. 26, 2014, pp. 588-592.

Extended European Search Report for European Application No. 16802501.3 dated Nov. 27, 2018, 7 pages.

Chaves et al., Adaptive Transmit Power for Wi-Fi Defense Deployments, 2014 IEEE 80th Vehicular Technology Conference (VCT2014-FALL), pp. 1-6, XP032694914, DOI: 10.1109/VTCFALL.2014. 6965858 [retrieved on Nov. 24, 2014].

* cited by examiner

WIRELESS COMMUNICATION METHOD AND DEVICE

The present application claims the priority of Chinese patent application No. 201510289954.3, filed with Chinese Patent Office on May 29, 2015, and entitled "WIRELESS COMMUNICATION METHOD AND DEVICE", the entire contents of which are herein incorporated by reference.

FIELD OF THE INVENTION

The present invention relates to the field of communications, and particularly relates to a wireless communication method and a wireless communication device.

BACKGROUND OF THE INVENTION

With the progress of information communication technology, various wireless communication technologies have been developed recently. Among the wireless communication technologies, a wireless local area network (WLAN) refer to a technology allowing surfing the Internet wirelessly using a portable terminal (such as intelligent mobile terminal, tablet computer, portable multimedia player, etc.) at home or in the workplace or in areas providing specific services.

At present, the 802.11 Protocol Group has established a research group of next generation Wi-Fi technology, i.e., high efficiency WLAN (HEW), with the main research tasks of improving the throughput over the existing Wi-Fi technology, improving the effective utilization efficiency of spectrum and improving the quality of experience (QoE). It has carried out much research on clear channel assessment (CCA), e.g., improving the re-utilization rate of space by changing the threshold of CCA, etc.

FIG. 1 shows a principle schematic diagram of a CCA mechanism in the prior art, wherein when station 1 transmits data to station 3, station 2 and the station 1 form an overlapping basis service set (OBSS), and according to the CCA mechanism of the existing Wi-Fi technology, the station 2 must set its CCA busy, and cannot simultaneously transmit data to station 4, so the efficiency of spectrum utilization is low.

SUMMARY OF THE INVENTION

The technical problem to be solved by the embodiments of the present invention lies in providing a wireless communication method and a wireless communication device, which enable the devices in an OBSS to simultaneously transmit data, so that the efficiency of spectrum utilization of a system is greatly improved.

In a first aspect, the embodiments of the present invention provide a wireless communication method, including:

determining by a first data transmitter whether the presence of a second data receiver is sensed, when the first data transmitter senses that a second data transmitter transmits data to the second data receiver; wherein the first data transmitter and the second data transmitter are located in an overlapping basis service set (OBSS), and the first data transmitter needs to transmit data to a first data receiver; analyzing by the first data transmitter whether the second data transmitter senses the presence of the first data receiver, when determining that the presence of a second data receiver is not sensed; and transmitting data to the first data receiver by the first data transmitter, when analyzing that the second data transmitter does not sense the presence of the first data receiver.

In combination with the first aspect, in a first possible implementation, the method further includes: collecting information of sensed stations and generating a first information set by the first data transmitter before the step of determining by the first data transmitter whether the presence of the second data receiver is sensed;

Wherein the step of determining by the first data transmitter whether the presence of the second data receiver is sensed includes:

checking whether the first information set comprises information of the second data receiver; determining that the presence of the second data receiver is sensed when checking that the first information set comprises information of the second data receiver; and determining that the presence of the second data receiver is not sensed when checking that the first information set does not comprise information of the second data receiver.

In combination with the first aspect, in a second possible implementation, the method further includes: receiving by the first data transmitter a second information set transmitted by the second data transmitter, before the step of analyzing by the first data transmitter whether the second data transmitter senses the presence of the first data receiver, wherein the second information set is a set of information of sensed stations collected by the second data transmitter;

wherein the step of analyzing by the first data transmitter whether the second data transmitter senses the presence of the first data receiver includes:

checking whether the second information set comprises information of the first data receiver; determining that the second data transmitter senses the presence of the first data receiver when checking that the second information set comprises information of the first data receiver; and determining that the second data transmitter does not sense the presence of the first data receiver when checking that the second information set does not comprise information of the first data receiver.

In combination with the first possible implementation of the first aspect, in a third possible implementation, the method further includes:

transmitting the first information set to other stations in the OBSS after the step of collecting information of sensed stations and generating a first information set by the first data transmitter.

In combination with the first aspect, or the first possible implementation of the first aspect, or the second possible implementation of the first aspect, or the third possible implementation of the first aspect, in a fourth possible implementation, wherein when the first data transmitter determines that the presence of the second data receiver is sensed, the first data transmitter analyzes whether the second data transmitter senses the presence of the first data receiver, and when the first data transmitter determines that the second data transmitter does not sense the presence of the first data receiver, the method further includes:

detecting by the first data transmitter whether the collected received signal strength indication (RSSI) corresponding to the first data receiver is greater than the received signal strength indication corresponding to the second data receiver;

reducing the transmitting power of the first data transmitter by transmission power control when detecting that the collected received signal strength indication corresponding to the first data receiver is greater than the received signal strength indication corresponding to the second data receiver, and transmitting data to the first data receiver after determining the first data transmitter does not sense the presence of the second data receiver.

In a second aspect, the embodiments of the present invention provide a wireless communication device, serving as a first data transmitter and including:

a sensing determination module, used for determining whether the presence of a second data receiver is sensed, when sensing that a second data transmitter transmits data to the second data receiver, wherein the first data transmitter and the second data transmitter are located in an overlapping basis service set (OBSS), and the first data transmitter needs to transmit data to a first data receiver;

a sensing analysis module, used for analyzing whether the second data transmitter senses the presence of the first data receiver when the sensing determination module determines that the presence of a second data receiver is not sensed; and a data transmitting module, used for transmitting data to the first data receiver when the sensing analysis module analyzes that the second data transmitter does not sense the presence of the first data receiver.

In combination with the second aspect, in a first possible implementation, the device further includes:

an information collection and generation module, used for collecting information of sensed stations and generating a first information set before the sensing determination module determines whether the presence of the second data receiver is sensed;

the sensing determination module includes:

a first checking unit, used for checking whether the first information set includes information of the second data receiver; determining that the presence of the second data receiver is sensed when checking that the first information set comprises information of the second data receiver; and determining that the presence of the second data receiver is not sensed when checking that the first information set does not comprise information of the second data receiver.

In combination with the second aspect, in a second possible implementation, the device further includes:

an information set receiving module, used for receiving a second information set transmitted by the second data transmitter before the sensing analysis module analyzes whether the second data transmitter senses the presence of the first data receiver: wherein the second information set is a set of information of sensed site stations collected by the second data transmitter;

the sensing analysis module includes:

a second checking unit, used for checking whether the second information set comprises information of the first data receiver; determining that the second data transmitter senses the presence of the first data receiver when checking that the second information set comprises information of the first data receiver; and determining that the second data transmitter does not sense the presence of the first data receiver when checking that the second information set does not comprise information of the first data receiver.

In combination with the first possible implementation of the second aspect, in a third possible implementation, the device further includes:

an information set transmitting module, used for transmitting the first information set to other stations in the OBSS after the information collection and generation module collects information of sensed stations and generates a first information set.

In combination with the second aspect, or the first possible implementation of the second aspect, or the second possible implementation of the second aspect, or the third possible implementation of the second aspect, in a fourth possible implementation, the device further includes:

a detection module, used for detecting whether the collected received signal strength indication corresponding to the first data receiver is greater than the received signal strength indication corresponding to the second data receiver, when the sensing determination module determines that the presence of the second data receiver is sensed and the sensing analysis module determines that the second data transmitter does not sense the presence of the first data receiver; and a control transmitting module, used for reducing the transmitting power of the first data transmitter by transmission power control when the detection module detects that the collected received signal strength indication corresponding to the first data receiver is greater than the received signal strength indication corresponding to the second data receiver, and transmitting data to the first data receiver after determining the first data transmitter does not sense the presence of the second data receiver.

Through the embodiments of the present invention, when a first data transmitter senses that a second data transmitter transmits data to a second data receiver, the first data transmitter determines whether the presence of the second data receiver is sensed; when determining that the presence of a second data receiver is not sensed, the first data transmitter analyzes whether the second data transmitter senses the presence of the first data receiver; and when analyzing that the second data transmitter does not sense the presence of the first data receiver, the first data transmitter transmits data to the first data receiver; in this way, the problem in the prior art that devices in the OBSS cannot simultaneously transmit data is solved, and a CCA mechanism in the prior art is improved to enable the devices in the OBSS to simultaneously transmit data, so that the efficiency of spectrum utilization of the system is greatly improved.

BRIEF DESCRIPTION OF THE DRAWINGS

To illustrate the technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, and other drawings may be obtained by those of ordinary skill in the art based on these drawings without any creative effort.

DETAILED DESCRIPTION OF THE EMBODIMENTS

A clear and complete description of the technical solutions in the embodiments of the present invention will be given below, in combination with the accompanying drawings in the embodiments of the present invention. Apparently, the described embodiments are merely a part, but not all, of the embodiments of the present invention. All of other embodiments, obtained by those of ordinary skill in the art, based on the embodiments of the present invention without any inventive effort, fall into the protection scope of the present invention.

It should be noted that the terms used in the embodiments of the present invention are merely for the purpose of describing specific embodiments, rather than limiting the present invention. The terms "one", "said" and "the" in a singular form used in the embodiments of the present invention and the appended claims are also intended to include a plural form, unless other meanings are clearly expressed in the context. It should also be understood that the term "and/or" used herein refers to and includes any or all possible combinations of one or more correlative listed items.

Figure 1:
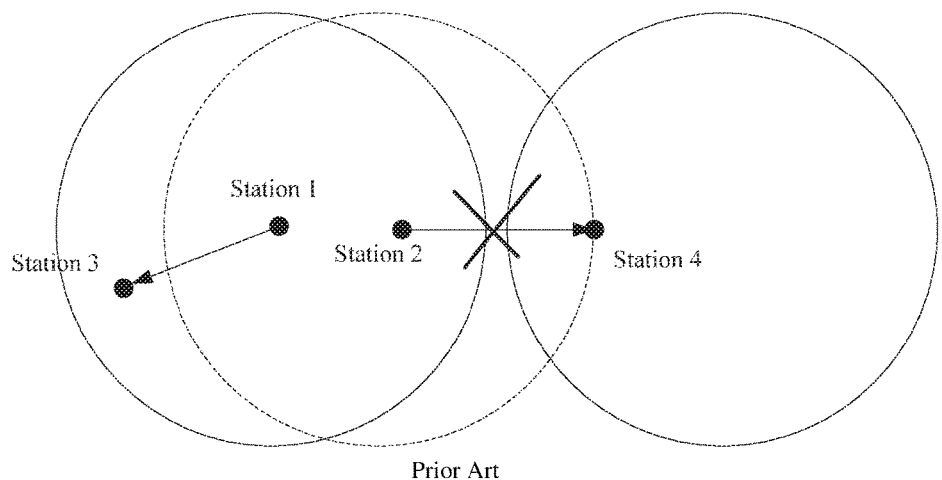
FIG. 1 is a principle schematic diagram of a CCA mechanism in the prior art.
Figure 2:
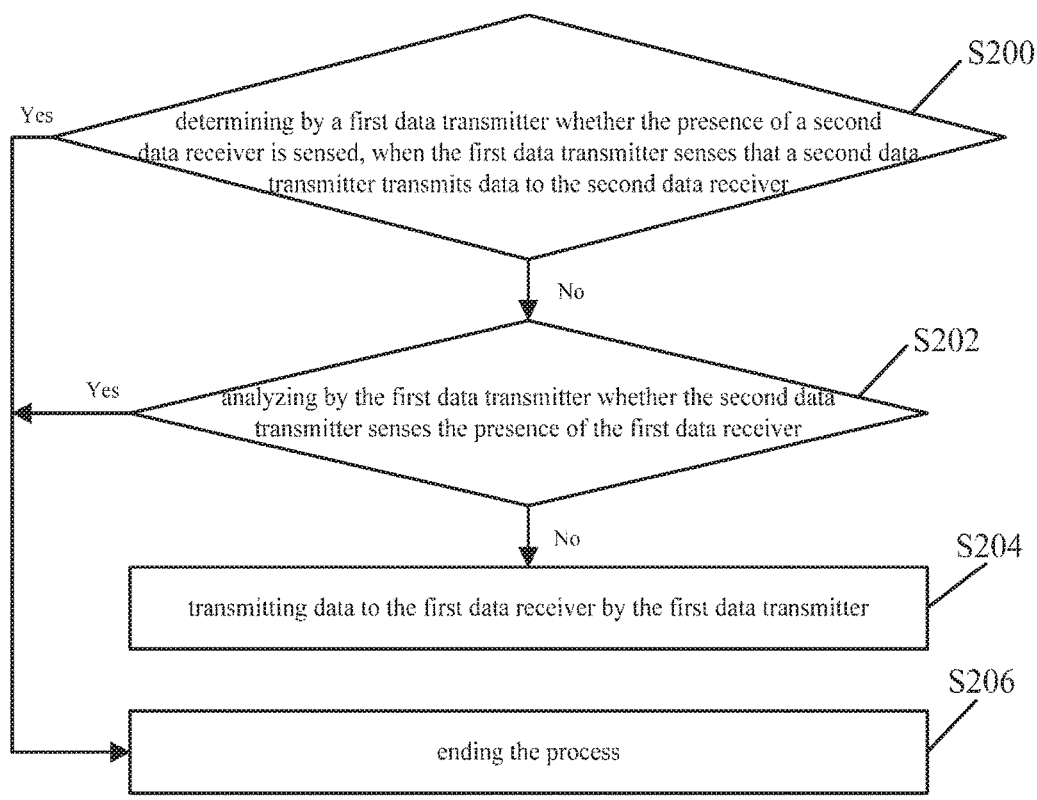
FIG. 2 is a flow schematic diagram of a wireless communication method provided by the present invention.

Referring to FIG. 2, a wireless communication method provided by the present invention includes:

Step S200: determining by a first data transmitter whether the presence of a second data receiver is sensed, when the first data transmitter senses that a second data transmitter transmits data to the second data receiver.

Specifically, the first data transmitter and the second data transmitter are located in an OBSS, and the first data transmitter needs to transmit data to a first data receiver; when the first data transmitter determines that the presence of the second data receiver can be sensed, e.g., if the first data transmitter and the second data receiver are located in the same BSS, step S206 is executed, otherwise, step S202 is executed;

Step S202: analyzing by the first data transmitter whether the second data transmitter senses the presence of the first data receiver.

Specifically, the first data transmitter further analyzes whether the second data transmitter senses the presence of the first data receiver, e.g., analyzing whether the second data transmitter and the first data receiver are located in the same BSS, and if the first data transmitter determines that the second data transmitter can sense the presence of the first data receiver, step S206 is executed, otherwise, step S204 is executed.

Step S204: transmitting data to the first data receiver by the first data transmitter.

Specifically, if the first data transmitter learns that the first data receiver and the second data receiver simultaneously receive data, the data transmitting of the second data transmitter does not interfere with the data receiving of the first data receiver, the data transmitting of the first data transmitter does not interfere with the data receiving of the second data receiver either, and the first data transmitter can transmit data to the first data receiver.

Step S206: ending the process.

Specifically, step S206 is not limited to ending the process, where next determination or analysis can be performed, or the first data transmitter sets its CCA busy and does not transmit data, etc., which is not limited herein.

Figure 3:
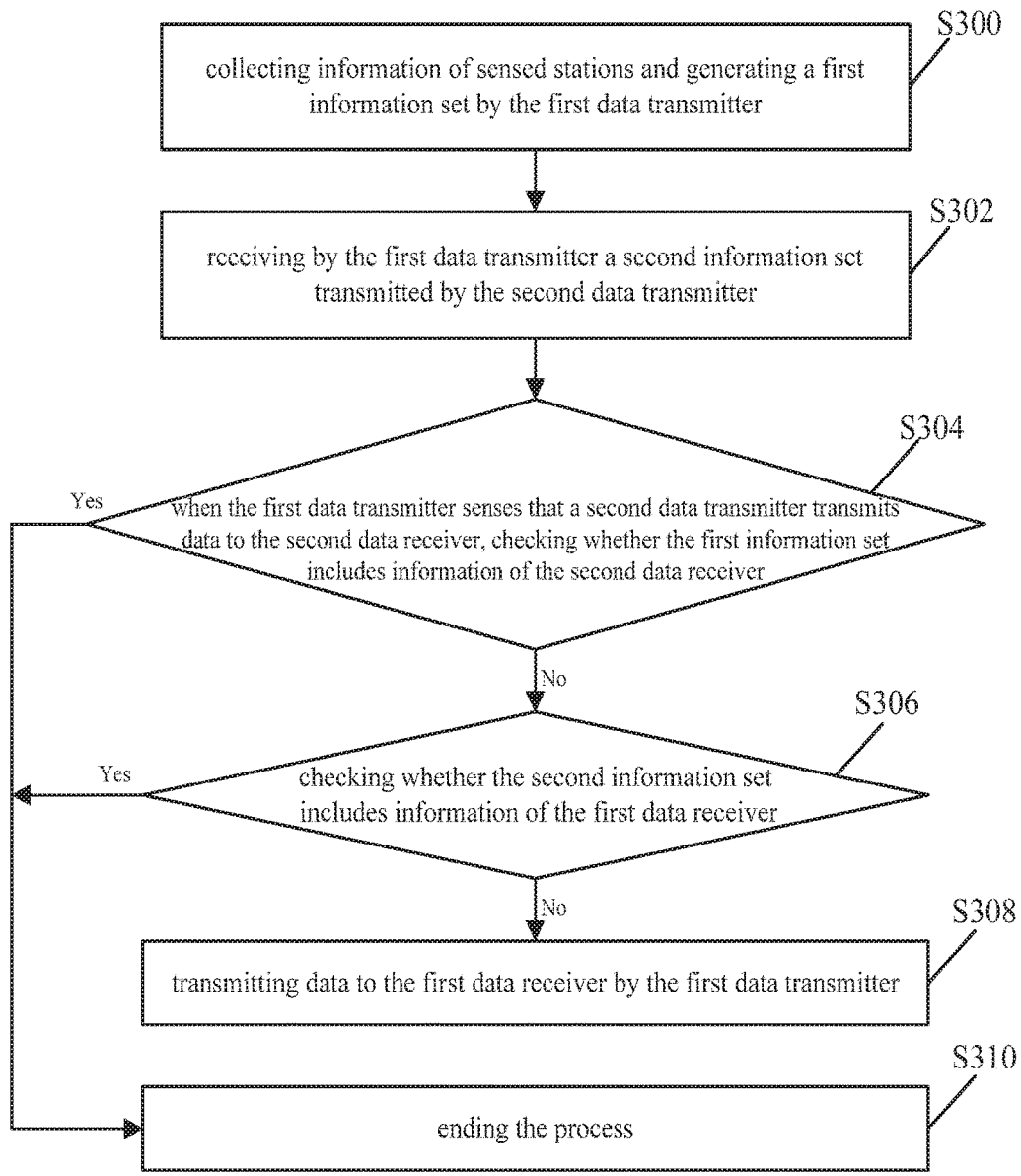
FIG. 3 is a flow schematic diagram of another embodiment of the wireless communication method provided by the present invention.

Through the embodiment of the present invention, when a first data transmitter senses that a second data transmitter transmits data to a second data receiver, the first data transmitter determines whether the presence of the second data receiver is sensed; when determining that the presence of a second data receiver is not sensed, the first data transmitter analyzes whether the second data transmitter senses the presence of the first data receiver; and when analyzing that the second data transmitter does not sense the presence of the first data receiver, the first data transmitter transmits data to the first data receiver; in this way, the problem in the prior art that devices in the OBSS cannot simultaneously transmit data is solved, and a CCA mechanism in the prior art is improved to enable the devices in the OBSS to simultaneously transmit data, so that the efficiency of spectrum utilization of the system is greatly improved. Further, FIG. 3 shows a flow schematic diagram of another embodiment of the wireless communication method provided by the present invention, the method includes:

Step S300: collecting information of sensed stations and generating a first information set by the first data transmitter.

Specifically, the first data transmitter can acquire information of surrounding stations, e.g., media access control (MAC) addresses, received signal strength indication (RSSI) and the like of sensed stations, and generate a first information set, which may include information of a plurality of stations.

Step S302: receiving by the first data transmitter a second information set transmitted by the second data transmitter.

Specifically, the second information set is a set of information of sensed stations collected by the second data transmitter; the devices in the OBSS can transmit information sets generated respectively thereby to each other in a sharing manner, i.e., after collecting information of sensed stations and generating a first information set, the first data transmitter can transmit the first information set to other stations in the OBSS; and after the step of collecting information of sensed stations and generating a second information set by the first data transmitter, the second data transmitter can transmit the second information set to other stations in the OBSS. Then, the first data transmitter receives the second information set transmitted by the second data transmitter.

Step S304: when the first data transmitter senses that the second data transmitter transmits data to the second data receiver, checking by the first data transmitter whether the first information set includes information of the second data receiver.

Specifically, the first data transmitter can determine whether the presence of the second data receiver is sensed by checking whether the first information set includes information of the second data receiver; when checking that the first information set comprises information of the second data receiver, the first data transmitter determines that the presence of the second data receiver is sensed, and step S310 is executed; and when checking that the first information set does not comprise information of the second data receiver, the first data transmitter determines that the presence of the second data receiver is not sensed, and step S306 is executed.

Step S306: checking whether the second information set includes information of the first data receiver.

Specifically, the first data transmitter can analyze whether the second data transmitter senses the presence of the first data receiver by checking whether the second information set includes information of the first data receiver; when checking that the second information set comprises information of the first data receiver, the first data transmitter determines that the second data transmitter senses the presence of the first data receiver, and step S310 is executed; and when checking that the second information set does not comprise information of the first data receiver, the first data transmitter determines that the second data transmitter does not sense the presence of the first data receiver, and step S306 is executed.

Step S308: transmitting data to the first data receiver by the first data transmitter.

Specifically, if the first data transmitter learns that the first data receiver and the second data receiver simultaneously receive data, the data transmitting of the second data transmitter does not interfere with the data receiving of the first data receiver, the data transmitting of the first data transmitter does not interfere with the data receiving of the second data receiver either, and the first data transmitter can transmit data to the first data receiver.

Step S310: ending the process.

Specifically, step S310 is not limited to ending the process, where next determination or analysis can be performed, or the first data transmitter sets its CCA busy and does not transmit data, etc., which is not limited herein.

Figure 4:
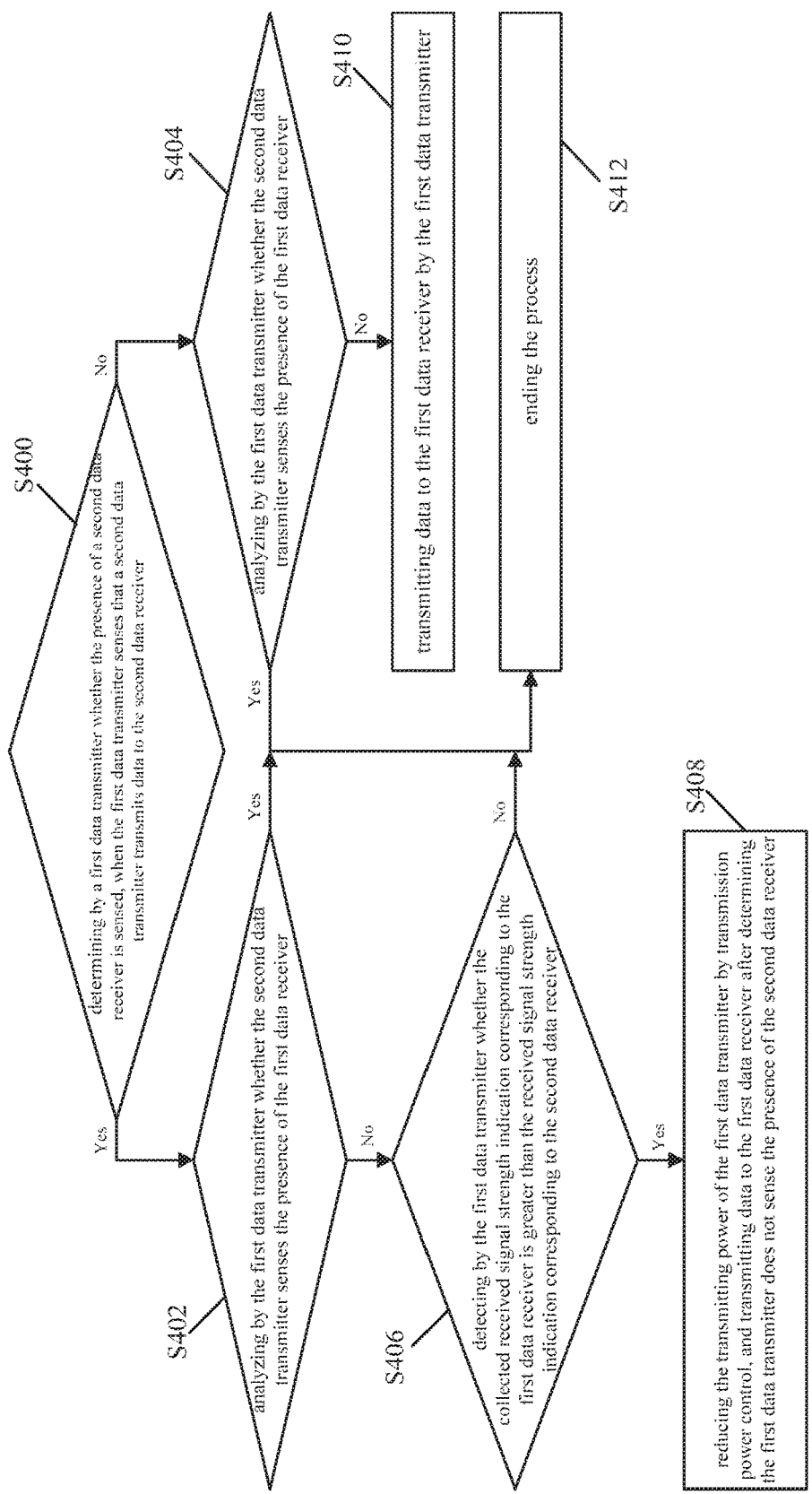
FIG. 4 is a flow schematic diagram of another embodiment of the wireless communication method provided by the present invention.

Further, FIG. 4 shows a flow schematic diagram of another embodiment of the wireless communication method provided by the present invention, the method includes:

Step S400: determining by a first data transmitter whether the presence of a second data receiver is sensed, when the first data transmitter senses that a second data transmitter transmits data to the second data receiver.

Specifically, the first data transmitter and the second data transmitter are located in an OBSS, and the first data transmitter needs to transmit data to a first data receiver; when the first data transmitter determines that the presence of the second data receiver can be sensed, e.g., if the first data transmitter and the second data receiver are located in the same BSS, step S402 is executed, otherwise, step S404 is executed.

Step S402: analyzing by the first data transmitter whether the second data transmitter senses the presence of the first data receiver.

Specifically, the first data transmitter further analyzes whether the second data transmitter senses the presence of the first data receiver, e.g., analyzing whether the second data transmitter and the first data receiver are located in the same BSS, and if the first data transmitter determines that the second data transmitter can sense the presence of the first data receiver, step S412 is executed, otherwise, step S406 is executed.

Step S404: analyzing by the first data transmitter whether the second data transmitter senses the presence of the first data receiver.

Specifically, the first data transmitter further analyzes whether the second data transmitter senses the presence of the first data receiver, e.g., analyzing whether the second data transmitter and the first data receiver are located in the same BSS, and if the first data transmitter determines that the second data transmitter can sense the presence of the first data receiver, step S412 is executed, otherwise, step S410 is executed.

Step S406: detecting by the first data transmitter whether the collected received signal strength indication corresponding to the first data receiver is greater than the received signal strength indication corresponding to the second data receiver.

Specifically, the first data transmitter can pre-acquire RSSI information of surrounding stations, and determine whether the RSSI corresponding to the first data receiver is greater than the RSSI corresponding to the second data receiver, and if greater, step S408 is executed, otherwise, step S412 is executed.

Step S408: reducing the transmitting power of the first data transmitter by transmission power control, and transmitting data to the first data receiver after determining the first data transmitter does not sense the presence of the second data receiver.

Specifically, the transmitting power of the first data transmitter is reduced by transmission power control (TPC), to achieve that the first data transmitter does not sense the presence of the second data receiver, but can sense the presence of the first data receiver, and can transmit data to the first data receiver.

Step S410: transmitting data to the first data receiver by the first data transmitter.

Specifically, if the first data transmitter learns that the first data receiver and the second data receiver simultaneously receive data, the data transmitting of the second data transmitter does not interfere with the data receiving of the first data receiver, the data transmitting of the first data transmitter does not interfere with the data receiving of the second data receiver either, and the first data transmitter can transmit data to the first data receiver.

Step S412: ending the process.

Specifically, step S412 is not limited to ending the process, where next determination or analysis can be performed, or the first data transmitter sets its CCA busy and does not transmit data, etc., which is not limited herein.

Through the embodiment of the present invention, when a first data transmitter senses that a second data transmitter transmits data to a second data receiver, the first data transmitter determines whether the presence of the second data receiver is sensed; when determining that the presence of a second data receiver is not sensed, the first data transmitter analyzes whether the second data transmitter senses the presence of the first data receiver; and when analyzing that the second data transmitter does not sense the presence of the first data receiver, the first data transmitter transmits data to the first data receiver; in this way, the problem in the prior art that devices in the OBSS cannot simultaneously transmit data is solved, and a CCA mechanism in the prior art is improved to enable the devices in the OBSS to simultaneously transmit data, so that the efficiency of spectrum utilization of the system is greatly improved. Elaborated above is the method of the embodiments of the present invention, and in order to better implement the above embodiments of the present invention, correspondingly, a related device for cooperatively implementing the above embodiments is further provided below.

Figure 5:
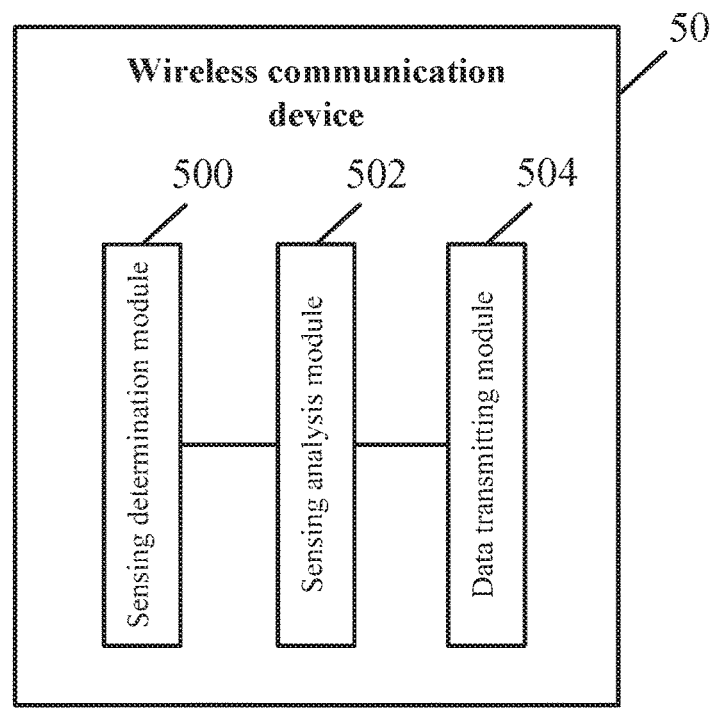
FIG. 5 is a structural schematic diagram of a wireless communication device provided by the present invention.

FIG. 5 shows a structural schematic diagram of a wireless communication device provided by the present invention. The wireless communication device 50 is a first data transmitter corresponding to the method embodiment, and may include a sensing determination module 500, a sensing analysis module 502 and a data transmitting module 504, wherein the sensing determination module 500 is used for determining whether the presence of a second data receiver is sensed, when sensing that a second data transmitter transmits data to the second data receiver, wherein the first data transmitter and the second data transmitter are located in an overlapping basis service set (OBSS), and the first data transmitter needs to transmit data to a first data receiver;

the sensing analysis module 502 is used for analyzing whether the second data transmitter senses the presence of the first data receiver when the sensing determination module 500 determines that the presence of a second data receiver is not sensed; and the data transmitting module 504 is used for transmitting data to the first data receiver when the sensing analysis module 502 analyzes that the second data transmitter does not sense the presence of the first data receive.

Figure 6:
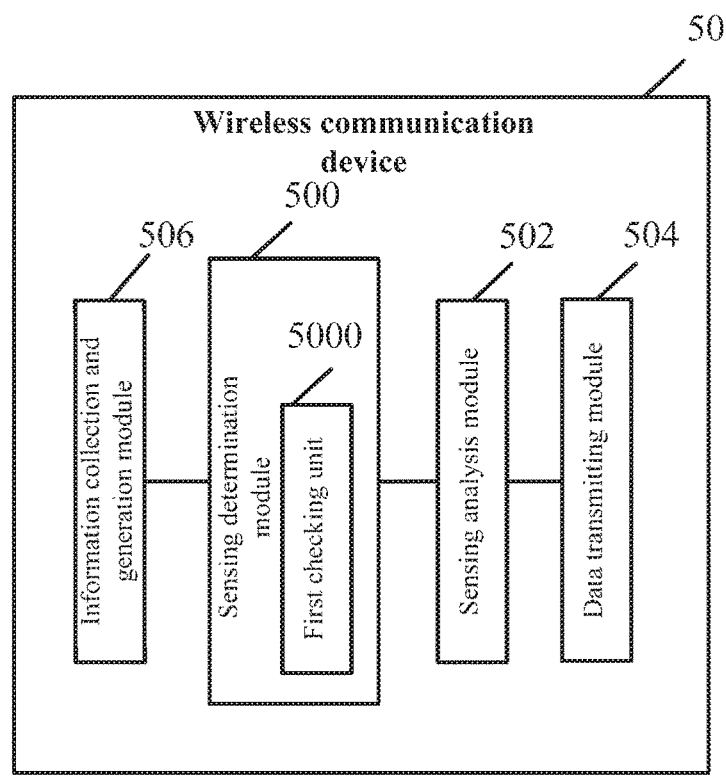
FIG. 6 is a structural schematic diagram of another embodiment of the wireless communication device provided by the present invention.

Specifically, FIG. 6 shows a structural schematic diagram of another embodiment of the wireless communication device provided by the present invention. The wireless communication device 50 is a first data transmitter corresponding to the method embodiment; in addition to a sensing determination module 500, a sensing analysis module 502 and a data transmitting module 504, the wireless communication equipment 50 may further include an information collection and generation module 506, and the sensing determination module 500 may include a first checking unit 5000, wherein the information collection and generation module 506 is used for collecting information of sensed stations and generating a first information set before the sensing determination module 500 determines whether the presence of the second data receiver is sensed;

the first checking unit 5000 is used for checking whether the first information set includes information of the second data receiver; determining that the presence of the second data receiver is sensed when checking that the first information set comprises information of the second data receiver; and determining that the presence of the second data receiver is not sensed when checking that the first information set does not comprise information of the second data receiver.

Figure 7:
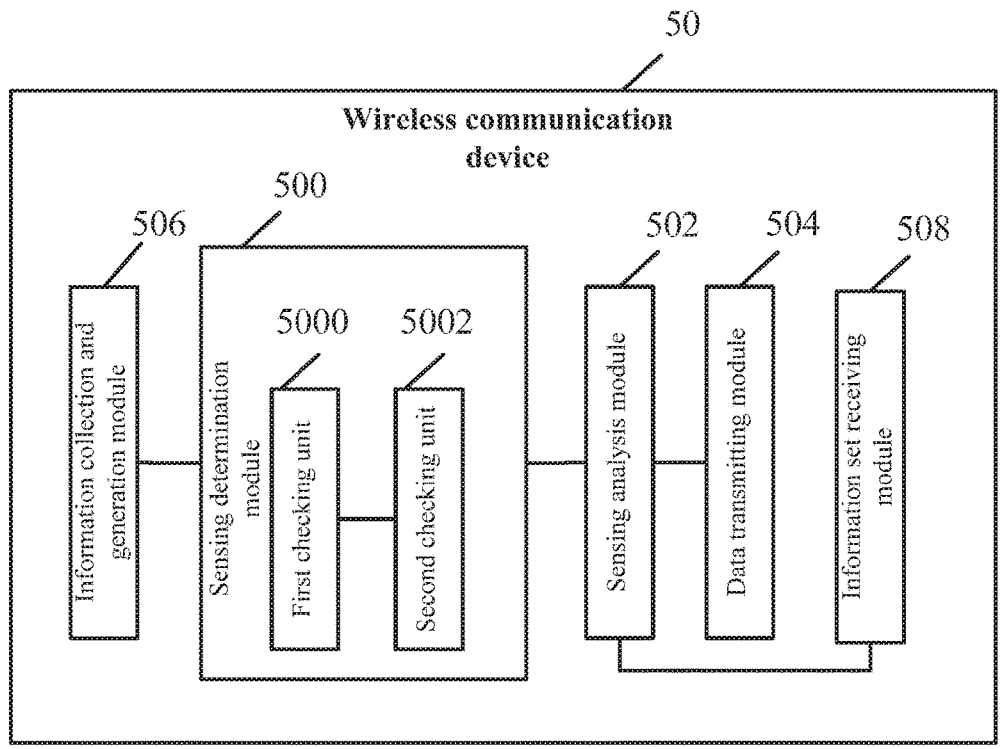
FIG. 7 is a structural schematic diagram of another embodiment of the wireless communication device provided by the present invention.

Further, FIG. 7 shows a structural schematic diagram of another embodiment of the wireless communication device provided by the present invention. The wireless communication device 50 is a first data transmitter corresponding to the method embodiment; in addition to a sensing determination module 500, a sensing analysis module 502, a data transmitting module 504 and an information collection and generation module 506, the wireless communication device 50 may further include an information set receiving module 508, and the sensing determination module 500 may include a first checking unit 5000 and a second checking unit 5002, wherein the information set receiving module 508 is used for receiving a second information set transmitted by the second data transmitter before the sensing analysis module 502 analyzes whether the second data transmitter senses the presence of the first data receiver; wherein the second information set is a set of information of sensed stations collected by the second data transmitter;

the second checking unit 5002 is used for checking whether the second information set includes information of the first data receiver; determining that the second data transmitter senses the presence of the first data receiver when checking that the second information set comprises information of the first data receiver; and determining that the second data transmitter does not sense the presence of the first data receiver when checking that the second information set does not comprise information of the first data receiver.

Figure 8:
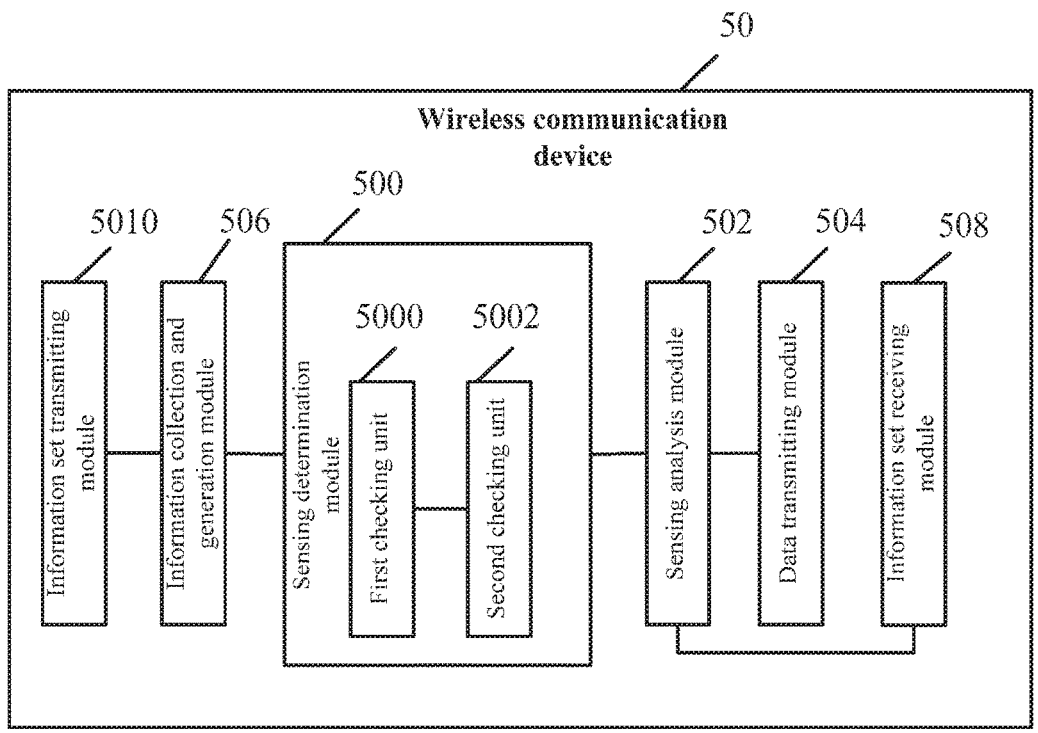
FIG. 8 is a structural schematic diagram of another embodiment of the wireless communication device provided by the present invention.

Further, FIG. 8 shows a structural schematic diagram of another embodiment of the wireless communication device provided by the present invention. The wireless communication device 50 is a first data transmitter corresponding to the method embodiment; in addition to a sensing determination module 500, a sensing analysis module 502, a data transmitting module 504, an information collection and generation module 506 and an information set receiving module 508, the wireless communication device 50 may further include an information set transmitting module 5010, which is used for transmitting the first information set to other stations in the OBSS after the information collection and generation module collects information of sensed stations and generates a first information set.

Figure 9:
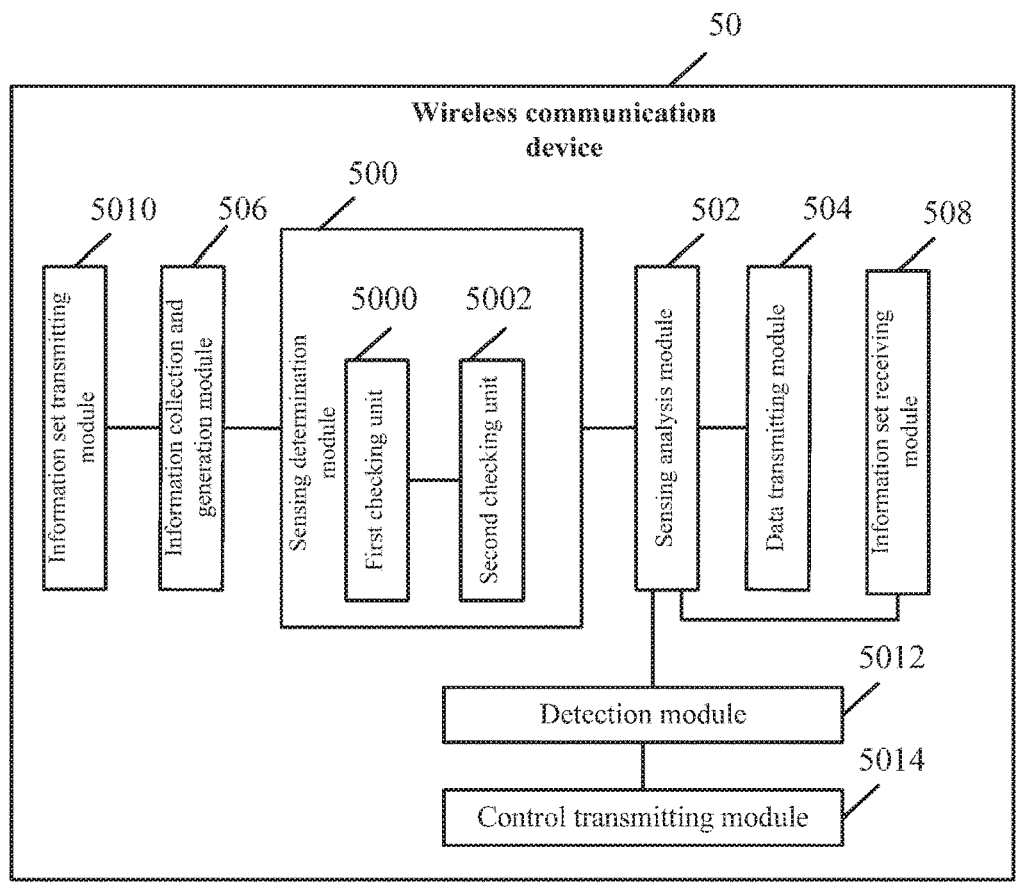
FIG. 9 is a structural schematic diagram of another embodiment of the wireless communication device provided by the present invention.

Further, FIG. 9 shows a structural schematic diagram of another embodiment of the wireless communication device provided by the present invention. In addition to a sensing determination module 500, a sensing analysis module 502, a data transmitting module 504, an information collection and generation module 506, an information set receiving module 508 and an information set transmitting module 5010, the wireless communication device 50 may further include a detection module 5012 and a control transmitting module 5014, wherein the detection module 5012 is used for detecting whether the collected received signal strength indication corresponding to the first data receiver is greater than the received signal strength indication corresponding to the second data receiver, when the sensing determination module 500 determines that the presence of the second data receiver is sensed, and the sensing analysis module 502 determines that the second data transmitter does not sense the presence of the first data receiver; and the control transmitting module 5014 is used for reducing the transmitting power of the first data transmitter by transmission power control when the detection module 5012 detects that the collected received signal strength indication corresponding to the first data receiver is greater than the received signal strength indication corresponding to the second data receiver, and transmitting data to the first data receiver after determining the first data transmitter does not sense the presence of the second data receiver.

It could be understood that the functions of the functional modules of the wireless communication device 50 in this embodiment can be specifically realized according to the method in the method embodiments, and are thus not redundantly described herein. The wireless receiving device 50 in the embodiment of the present invention may be, for example, a tablet computer, a personal digital assistant, a smart mobile terminal or other network devices.

Figure 10:
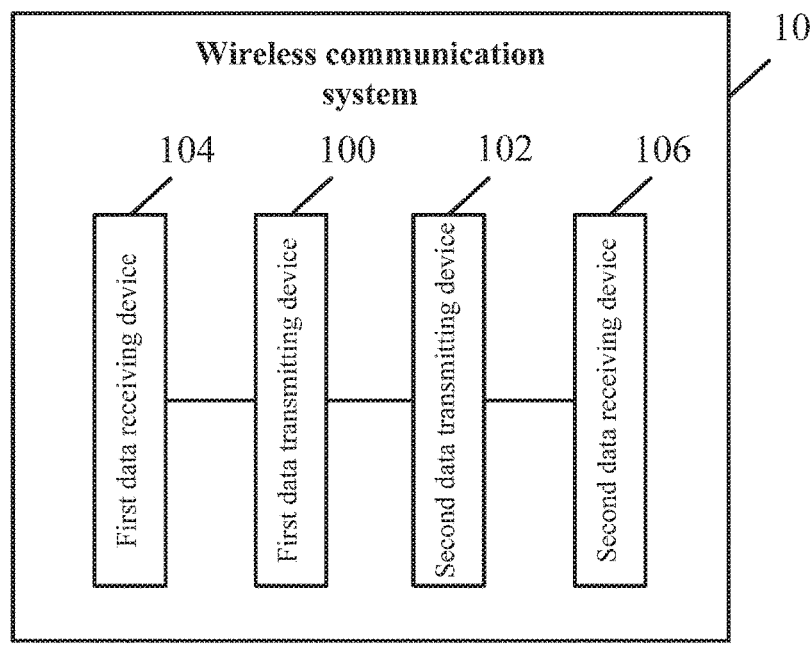
FIG. 10 is a structural schematic diagram of a wireless communication system provided by the present invention.

In order to better implement the above embodiments of the present invention, the present invention further provides a related system for cooperatively implementing the above embodiments. It will be described in detail below in conjunction with a structural schematic diagram of a wireless communication system provided by the present invention as shown in FIG. 10:

The wireless communication system 10 includes first data transmitting device 100, second data transmitting device 102, first data receiving device 104 and second data receiving device 106, wherein the first data transmitting device 100 may be the wireless communication device 50 in the above embodiments, and is thus not redundantly described herein. The second data transmitting device 102, the first data receiving device 104 and the second data receiving device 106 may correspond to the second data transmitter, the first data receiver and the second data receiver in the above embodiments respectively.

How the wireless communication system 10 carries out wireless communication can be specifically implemented according to the method in the method embodiments, and is thus not redundantly described herein.

Through the embodiment of the present invention, when a first data transmitter senses that a second data transmitter transmits data to a second data receiver, the first data transmitter determines whether the presence of the second data receiver is sensed; when determining that the presence of a second data receiver is not sensed, the first data transmitter analyzes whether the second data transmitter senses the presence of the first data receiver; and when analyzing that the second data transmitter does not sense the presence of the first data receiver, the first data transmitter transmits data to the first data receiver; in this way, the problem in the prior art that devices in the OBSS cannot simultaneously transmit data is solved, and a CCA mechanism in the prior art is improved to enable the devices in the OBSS to simultaneously transmit data, so that the efficiency of spectrum utilization of the system is greatly improved.

It should be appreciated by those of ordinary skill in the art that all or part of the procedures in the method of the above-mentioned embodiments may be implemented with a computer program instructing related hardware. The program may be stored in a computer readable storage medium. When the program is executed, the procedures of the embodiments of the above-mentioned method may be included. The storage medium may be a magnetic disk, an optical disk, a read-only memory (ROM), a random access memory (RAM) or the like.

Disclosed above are merely specific embodiments of the present invention, and of course the protection scope of the present invention is not limited thereto. The ordinary skilled person in the art could understand that equivalent variations made for implementing all or part of the procedures in the above-mentioned embodiments, and equivalent variations made according to the claims of the present invention, still fall into the scope of the present invention.

The invention claimed is:

1. A wireless communication method, comprising:
   determining by a first data transmitter whether the presence of a second data receiver is sensed, when the first data transmitter senses that a second data transmitter transmits data to the second data receiver; wherein the first data transmitter and the second data transmitter are located in an overlapping basis service set (OBSS), and the first data transmitter needs to transmit data to a first data receiver;
   analyzing by the first data transmitter whether the second data transmitter senses the presence of the first data receiver, when determining that the presence of a second data receiver is not sensed; and
   transmitting data to the first data receiver by the first data transmitter, when analyzing that the second data transmitter does not sense the presence of the first data receiver; and
   when the first data transmitter determines that the presence of the second data receiver is sensed, the first data transmitter analyzes whether the second data transmitter senses the presence of the first data receiver, and when the first data transmitter determines that the second data transmitter does not sense the presence of the first data receiver, further comprising:
   detecting by the first data transmitter whether a collected received signal strength indication corresponding to the first data receiver is greater than a received signal strength indication corresponding to the second data receiver; and
   reducing a transmitting power of the first data transmitter by transmission power control when detecting that the collected received signal strength indication corresponding to the first data receiver is greater than the received signal strength indication corresponding to the second data receiver, and transmitting data to the first data receiver after determining the first data transmitter does not sense the presence of the second data receiver.

2. The wireless communication method of claim 1, further comprising:
   collecting information of sensed stations and generating a first information set by the first data transmitter before the step of determining by the first data transmitter whether the presence of the second data receiver is sensed;
   wherein the step of determining by the first data transmitter whether the presence of the second data receiver is sensed comprises:
   checking whether the first information set comprises information of the second data receiver; determining that the presence of the second data receiver is sensed when checking that the first information set comprises information of the second data receiver; and
   determining that the presence of the second data receiver is not sensed when checking that the first information set does not comprise information of the second data receiver.

3. The wireless communication method of claim 2, further comprising: transmitting the first information set to other stations in the OBSS after the step of collecting information of sensed stations and generating a first information set by the first data transmitter.

4. The wireless communication method of claim 1, further comprising:
   receiving by the first data transmitter a second information set transmitted by the second data transmitter, before the step of analyzing by the first data transmitter whether the second data transmitter senses the presence of the first data receiver, wherein the second information set is a set of information of sensed stations collected by the second data transmitter;
   wherein the step of analyzing by the first data transmitter whether the second data transmitter senses the presence of the first data receiver comprises:
   checking whether the second information set comprises information of the first data receiver; determining that the second data transmitter senses the presence of the first data receiver when checking that the second information set comprises information of the first data receiver; and
   determining that the second data transmitter does not sense the presence of the first data receiver when checking that the second information set does not comprise information of the first data receiver.

5. A wireless communication device, serving as a first data transmitter and comprising:
   a processor, configured to:
   determine whether the presence of a second data receiver is sensed, when sensing that a second data transmitter transmits data to the second data receiver, wherein the first data transmitter and the second data transmitter are located in an overlapping basis service set (OBSS), and the first data transmitter needs to transmit data to a first data receiver; and analyze whether the second data transmitter senses the presence of the first data receiver when the processor determines that the presence of a second data receiver is not sensed; and a data transmitter, configured to transmit data to the first data receiver when the processor analyzes that the second data transmitter does not sense the presence of the first data receiver; and the processor is further configured to:

detect whether a collected received signal strength indication corresponding to the first data receiver is greater than a received signal strength indication corresponding to the second data receiver, when the processor determines that the presence of the second data receiver is sensed and the processor determines that the second data transmitter does not sense the presence of the first data receiver; and reduce a transmitting power of the first data transmitter by transmission power control when the processor detects that the collected received signal strength indication corresponding to the first data receiver is greater than the received signal strength indication corresponding to the second data receiver, and transmit data to the first data receiver after determining the first data transmitter does not sense the presence of the second data receiver.

6. The wireless communication device of claim 5, the processor is further configured to:

collect information of sensed stations and generate a first information set before the processor determines whether the presence of the second data receiver is sensed;

check whether the first information set comprises information of the second data receiver; determine that the presence of the second data receiver is sensed when checking that the first information set comprises information of the second data receiver; and determine that the presence of the second data receiver is not sensed when checking that the first information set does not comprise information of the second data receiver.

7. The wireless communication device of claim 6, the processor is further configured to:

transmit the first information set to other stations in the OBSS after the processor collects information of sensed stations and generates a first information set.

8. The wireless communication device of claim 5, the processor is further configured to:

receive a second information set transmitted by the second data transmitter before the processor analyzes whether the second data transmitter senses the presence of the first data receiver; wherein the second information set is a set of information of sensed stations collected by the second data transmitter;

check whether the second information set comprises information of the first data receiver; determine determining that the second data transmitter senses the presence of the first data receiver when checking that the second information set comprises information of the first data receiver; and determine that the second data transmitter does not sense the presence of the first data receiver when checking that the second information set does not comprise information of the first data receiver.

* * * * *